United States Patent [19]

Mace et al.

[11] 3,817,967

[45] June 18, 1974

[54] MODIFICATION OF ORGANIC POLYMERS

[75] Inventors: Jacques Mace, Versailles; Rene Pornin, Arthez-de-Bearn, both of France

[73] Assignee: Societe Nationale Des Petroles D'Aquitaine, Courbevoie, France

[22] Filed: Feb. 25, 1972

[21] Appl. No.: 229,503

Related U.S. Application Data

[63] Continuation of Ser. No. 796,540, Feb. 4, 1969, abandoned.

[30] Foreign Application Priority Data

Feb. 5, 1968  France .......................... 68.138688

[52] U.S. Cl. ........ 260/93.5 A, 260/877, 260/878 B, 260/880 B, 260/884, 260/885
[51] Int. Cl. ............................................. C08f 27/04
[58] Field of Search ......... 260/93.5 A, 665 R, 41 B, 260/877

[56] References Cited
UNITED STATES PATENTS

| | | | |
|---|---|---|---|
| 2,761,854 | 9/1956 | Coler | 260/38 |
| 2,800,559 | 7/1957 | Ubbelohde | 260/665 |
| 3,492,369 | 1/1970 | Naylor | 260/880 |

FOREIGN PATENTS OR APPLICATIONS

| | | | |
|---|---|---|---|
| 873,656 | 7/1961 | Great Britain | 260/877 |

OTHER PUBLICATIONS

Morton et al. – "Metalation of Polytyrene" – Journal of Organic Chem. – Vol. 24, pp. 1,167–1,169

Claff et al. – Journal of Organic Chem. Vol. 20, pp. 981–986

*Primary Examiner*—James A. Seidleck
*Attorney, Agent, or Firm*—Norman S. Blodgett; Gerry A. Blodgett

[57] ABSTRACT

A commercially very useful method has been developed for activating aryl-vinyl homo- or co-polymers to rendering them capable of reacting with various substances modifying the properties of the polymers.

The method consists in thoroughly mixing the polymer by kneading with it an alkali metal, generally in an amount of 0.1 to 5 % by weight of the polymer. The mixing is carried out at a temperature at which the materials are soft enough to give a homogenous dispersion of the metal in the polymer; the temperature is of 20° to 220°C and preferably of 100° to 150°C.

The method is particularly useful for polystyrene and polymers of styrene derivatives or homoloques. The polymers become then able to have, bound to their molecules, various groups resulting from the reaction of the active sites of the polymer with such substances as: carbon oxychloride, sulfochloride or dioxide; hydrogen sulfide; cyanide; alkali metal bicarbonate; halohydrocarbons, olefin oxides, vinyl chloride, acrylic or methacrylic esters, olefins or diolefins.

10 Claims, No Drawings

MODIFICATION OF ORGANIC POLYMERS

This is a continuation of application Ser. No. 796,540 filed Feb. 4, 1969 now abandoned.

The invention relates to a new process for the modification of aryl-vinyl polymer and more especially of the polymers of styrene, its homologues or derivatives.

It particularly concerns such operations as the fixing of various groups, cross-linking, vulcanizing, grafting or other chemical modifications of aryl-vinyl homo- or co-polymers.

The modern technology of plastics is more and more directed to the chemical modifications of the usual basic polymers, to change their properties so as to satisfy present diversified needs. To activate an unsaturated polymer, such as polybutadiene, polyisoprene for instance, in view of fixing on it other groups, one can apply the known method, which consists in treating the polymer in solution or in suspension, with an alkali metal in an amount in excess over the amount of double bonds in the polymer, the reaction being catalyzed by an aryl-hydrocarbon. The same method can be used for the grafting of polymers or copolymers with hetero-atoms, such as polyacrylates, polyacrylonitriles, polyvinyl-benzophenone, etc. On the contrary, with polymers having neither unsaturates, nor hetero-atoms, and more especially with aryl-vinyl polymers, the above method does not give satisfactory results: thus, for instance, for grafting various desired groups on polystyrene, one has to use a more complicated process, that consists in having a special amine with organo-lithium complex react on a polystyrene solution. Since styrene resins have a great commerical importance, and as it is important to be able to modify their properties according to their uses, there was much interest in developing an economical process for their modification.

The present invention solves this problem in a simple and a new manner, that can be easily realized on an industrial scale. It allows one to activate an aryl-vinyl polymer, especially a polystyrene, poly-α-methyl-styrene, poly-vinyl-toluene or poly-vinyl-naphtalene, in such a manner as to make them able to fix various groups modifying the polymer properties.

The process according to the invention consists first in activating an aryl-vinyl- homo- or co-polymer resin by intimately kneading it with a small quantity of alcaline metal.

Preferably, the kneading is carried out at a temperature high enough to soften the resin and the metal to a point that the metal well disperse in the resin. Thus, according to the nature of the chosen metal and that of the resin, the operation can be effected at various temperatures lower than 220° C and preferably between 100° and 150° C.

The metal, more particularly sodium, potassium or lithium, can be taken as a powder, a paste, or a liquid. It can be an alloy, such for example as amalgam, and/or an alloy made of several alkali metals.

Sodium being the cheapest metal, very malleable at a relatively low temperature, and melting at 97° C, it is particularly convenient for the practical realization of the process according to the invention.

The proportion of metal, as related to the polymer to be activated, can vary according to the nature and the degree of the desired modification; it is, more often, of 0.1 to 100 atoms of metal per mole of polymer, depending on the number of active sites to be created in the polymer; according to the molar weight of the resin, this proportion is generally of the order of 0.0001 to 0.1 atom of alkali metal per mole of the monomer constituting the given polymer or copolymer. By weight, in the case of the sodium, it is generally from 0.1 to 5% of the resin employed, and preferably from 0.2 to 2%, that is markedly lower than in the above mentioned known processes.

As the reaction between the metal and the resin takes place in bulk, it is necessary to insure an intimate mixing, so as to get a good distribution of the metal throughout the resin. To this end, any mixer of a known type, for instance a cylinder grinder, is convenient, but the mixed material must be protected from the contact with air, and the operation has to be realized under an appropriate inert atmospher, such as nitrogen, argon, helium, methane, ethane or other. In the particular case of the lithium, or in presence of lithium, it is preferable not to employ nitrogen, so as to avoid the nitridation of the metal. In the preferred embodiment, the kneading should continue until there is no more free (unreacted) metal in the mixture.

The polymer, activated according to the hereabove described process, can react with a great number of substances of very different natures: organic or mineral halogenated compounds, such as carbon oxychloride, sulfur chloride, halo-hydrocarbons; carbon dioxide, carboxylic acids, hydrogen sulfide, cyanogen, nitriles, etc., various dye-stuffs; tensio-active compounds with polar molecules; other activated polymers; various polymerisable monomers and so on.

Thus, for instance, sodium activated polystyrene can react with ethylene oxide; according to the proportion of the latter, one can obtain a polystyrene with a molecule terminated by hydroxyl groups, or a block copolymer styrene-ethylene-oxide. In a similar manner, block-copolymer can be obtained by reacting the activated polystyrene with a vinyl- or vinyliden- or olefinic-compound, for instance vinylchloride, ethylene, propylene, butadiene, etc.

One can see that, according to the nature of the chosen material, the invention makes possible cross-linking, for instance in the case of carbon oxychloride, carboxylic compounds, etc., the formation of sequence copolymers, especially by using monomers, or the formation of grafted polymers.

The proportion of modifying compounds, that is to say of the compounds added to the activated polymer, depends, of course, on the degree of the desired modification; the proportion is more often than not of the order of 5 to 100% by weight of the treated polymer.

A special application of the new process is the suppression of the non-polymerized monomer which remains in certain resins and unfavorably affects their qualities. It is known, for instance, that commerical polystyrene contains generally 0.05 to 0.5% of styrene which hinders some uses of the polymer. According to the invention, it is sufficient to knead the polymer with a small amount of metal, so as to activate it, to render it able to react with the monomer it contains; then, this monomer reacts with the macromolecules. Thus, for instance, in the case of polystyrene kneading with a very small proportion of sodium which may be of the order of 0.05%, provides for the complete, or almost complete, suppression of free styrene.

The invention is illustrated with the non-limitative following examples.

EXAMPLE 1

1% of sodium is added to 500g of crystal grade polystyrene having an inherent viscosity of 0.87, under an inert atmosphere; the polystyrene, heated to 140° C, is kneaded with the sodium, under the inert atmosphere. The mass thus formed has a brown-reddish coloration. After kneading for half-an-hour at this temperature, anhydrous carbon dioxide is injected into the mixer used, while keeping on the kneading. A little while afterwards, the red coloration vanishes.

After dissolving in some benzene a sample of the treated polystyrene, and then precipitating with methanol, the carboxyle proportion, found in the precipitate, is equal to 1 COOH group per 45 styrene radicals. The carboxylic compound differs from the starting polystyrene in that the viscosity of its solutions increases more rapidly when concentration is increased.

EXAMPLE 2

In a mixer with a tight closure, similar to the one employed in the example 1, 2 kg of polystyrene are malaxed at 115° C, with 20g of sodium. The product obtained is reddish, with a persistent coloration; its viscosity is identical to that of the starting polystyrene.

To the polystyrene thus activated, 50g of sodium bicarbonate and 50g of citric acid are added, as fine powders, and the mixture is kneaded for a few minutes. The examination of the product thus obtained shows carboxylic groups are bound to the styrenic chains.

EXAMPLE 3

500 g of crystal grade polystyrene are kneaded during 20 minutes at 150° C under a nitrogen atmosphere, with 2% of a 78%K-22% Na alloy, liquid at ambient temperature. The mass thus obtained is cooled down to below 100° C, and 150 ml of methyl-methacrylate are added to it; the whole is then malaxed at 100° C for a few minutes. The methyl-methacrylate reacts quickly. After extracting the homopolymer of the methyl-methacrylate with a water-ethanol mixture, there remains a grafted copolymer containing 15% of polymethyl-methacrylate.

EXAMPLE 4

An operation similar to that of example 3 is carried out with 75 ml of methylmethacrylate for 500g of crystal polystyrene previously activated by kneading with 1% of sodium at 115° C. The grafted copolymer thus obtained contained less than 10% of methacrylic groups.

EXAMPLE 5

As in the preceeding example, 500 g of crystal polystyrene are activated by mixing and kneading it with 1% of sodium at 150° C, until a homogeneous red coloration is obtained, that is during about 15 minutes. The mass thus obtained is cooled down to the ambient temperature and is mixed with 200 ml of 1,2-propene oxide. There is an immediate reaction with a corresponding temperature increase. Thus, 620 g of a white mass, with a slightly greasy touch are obtained. After dissolving it, in benzene, and then precipitating with ethanol, the polymer thus obtained contains about 15% of propylene oxide fixed on the polystyrene; the evaporation of the precipitating liquor gives 40g of a polymer which is identified as being homo-poly-oxymethylene.

EXAMPLE 6

In a mixer with a tight closure, polystyrene is activated with sodium, as in the preceeding example; the mass obtained is then cooled down to ambient temperature and is kept kneading while some ethylene oxide is injected.

The examination of the copolymer formed shows the presence of 65% of ethylene oxide for 35% of polystyrene, in the fraction soluble in methanol. The insoluble fraction contains about 15% of polyoxymethylene.

EXAMPLE 7

An operation, as in example 6, is carried out with dry butadiene instead of ethylene oxide.

The copolymer thus obtained is composed of a fraction soluble in acetone, containing 67% of polybutadiene, and an insoluble fraction, containing 86% of polybutadiene. Usual extraction methods are not capable of separating homo-polystyrene.

EXAMPLE 8

The operations of example 3 are repeated except that poly-α-methyl-styrene is used instead of polystyrene. The result is similar to that obtained in example 3.

We claim:

1. Process for activating a resin selected from the group consisting of homopolymers of styrene, α-methyl-styrene, vinyl-toluene and vinyl-naphthalene to enable said resin to react with materials capable of fixing themselves on its active sites, comprising reacting 1 part by weight of said resin with 0.1 – 5 percent by weight of a member selected from the group consisting of sodium, potassium, lithium, the amalgams thereof under an inert atmosphere, by bulk kneading said resin and said member at a temperature of 20° to 220° C until obtaining a kneaded mass containing substantially no free, unreacted alkali metals.

2. Process for activating polystyrene to enable it to react with materials capable of fixing themselves on its active sites, comprising reacting 1 part by weight of said polystyrene with 0.1 – 5 percent by weight of a member selected from the group consisting of sodium, potassium, lithium, the amalgams thereof and the alloys thereof by bulk kneading said polystyrene and said member at a temperature of 20° to 220° C until obtaining a kneaded mass containing substantially no free unreacted alkali metals.

3. Process for activating polystyrene according to claim 2, wherein the member of said group is sodium.

4. Process for activating polystyrene according to claim 2, wherein the member of said group is potassium.

5. A process for activating a resin as recited in claim 1, wherein the bulk kneading takes place under an atmosphere inert to the member.

6. A process for activating a resin as recited in claim 1, wherein the member is present in a concentration of 0.2 to 2.0 percent by weight.

7. A process for activating a resin as recited in claim 1, wherein the bulk kneading is carried out at a temperature of 100° to 220° C.

8. A process for activating a resin as recited in claim 1, wherein the bulk kneading is carried out at a temperature of 100° to 150° C.

9. A process for activating a resin as recited in claim 1, wherein the bulk kneading is carried out at a temperature of 115° to 150° C.

10. A process for activating a resin as recited in claim 1, wherein the bulk kneading is carried out at a temperature within the softening temperature range of the resin.

* * * * *